United States Patent
Giard

[19]

[11] Patent Number: 6,058,800
[45] Date of Patent: May 9, 2000

[54] BICYCLE HANDLEBAR STEM

[75] Inventor: Edward Giard, Sun Prairie, Wis.

[73] Assignee: Trek Bicycle Corporation, Waterloo, Wis.

[21] Appl. No.: 09/114,960

[22] Filed: Jul. 13, 1998

[51] Int. Cl.$^7$ .................................................. B62K 21/12
[52] U.S. Cl. ........................ 74/551.1; 74/551.3; 280/279
[58] Field of Search ................... 74/551.1–551.8; 280/279, 264; 403/104

[56] References Cited

U.S. PATENT DOCUMENTS

| | | | |
|---|---|---|---|
| 2,484,551 | 10/1949 | Brouse | 403/104 |
| 4,323,263 | 4/1982 | Cook et al. | 280/279 |
| 5,273,302 | 12/1993 | Ureel | 280/279 |
| 5,373,757 | 12/1994 | Bigall | 74/551.3 |
| 5,400,676 | 3/1995 | Kao | 74/551.1 |
| 5,509,328 | 4/1996 | Lai | 74/551.3 |
| 5,678,458 | 10/1997 | Kao | 74/551.3 |
| 5,791,671 | 8/1998 | Tang et al. | 280/264 |
| 5,881,606 | 3/1999 | Roddy | 74/551.3 |

FOREIGN PATENT DOCUMENTS

| 2531026 | 2/1984 | France | 74/551.1 |
|---|---|---|---|

OTHER PUBLICATIONS

Pending patent application: Bicycle Handlebar Attachment Device; U.S. application No. 08/806,202, Roddy, Feb. 26, 1997.
Oct. 1995 issue *BMX PLUS!* magazine: cover page and 11 select pages (7 unidentified and pages 25, 33, 80,82).
Kalloy Industrial Co., Ltd. drawing, No. 85,02,16.

*Primary Examiner*—Vinh T. Luong
*Attorney, Agent, or Firm*—Boyle Fredrickson Ziolkowski S.C.; James F. Boyle

[57] ABSTRACT

A bicycle handlebar stem for attaching a handlebar to the steering tube on a bicycle includes a continuous wall section which extends continuously and completely around the steering tube from one side to the other of a tubular central portion of the stem without any gaps or spaces therebetween. A slot in the center of the tubular central portion of the stem provides a means for reducing the diameter of the central opening formed by the continuous wall section for attaching and tightening the stem onto the end of the steering fork. An arcuate-shaped cover member on the opposite end of the stem, the cover member and stem and having cooperating semi-cylindrical clamping surfaces, provides a means for attaching and tightening the handlebar onto the stem. The cover member is attached to the stem by virtue of a mechanical hinge and a single fastener.

11 Claims, 4 Drawing Sheets

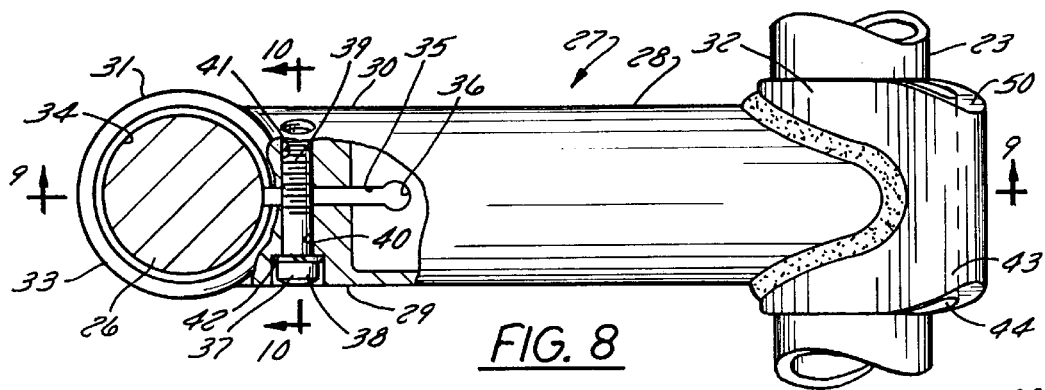
FIG. 8
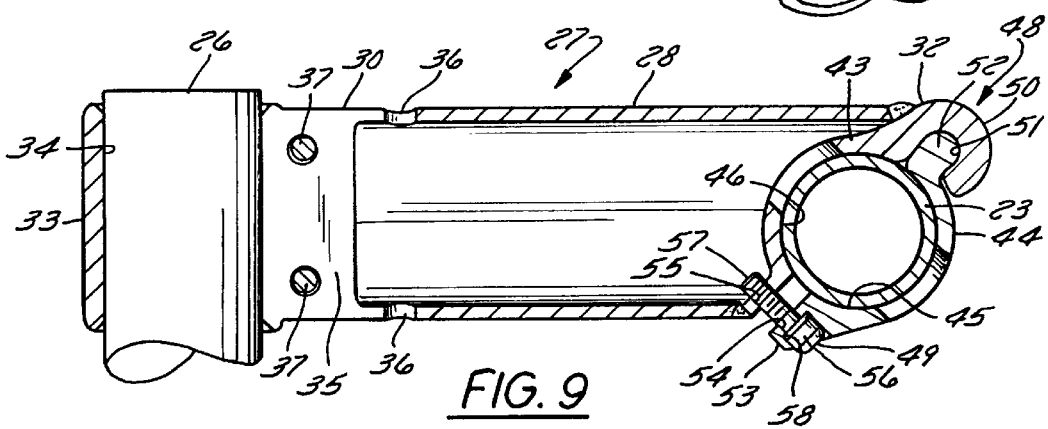
FIG. 9
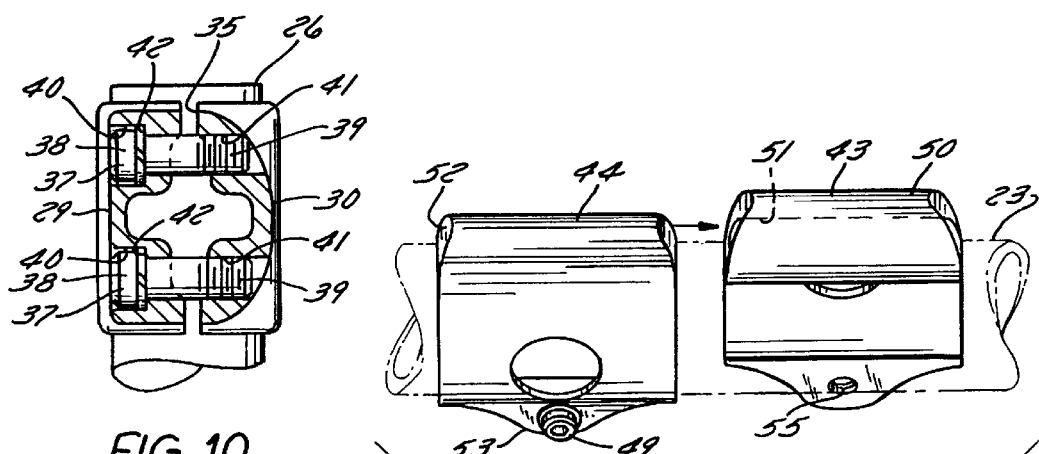
FIG. 10
FIG. 11

BICYCLE HANDLEBAR STEM

BACKGROUND OF THE INVENTION

1. Field of the Invention

The present invention relates to a bicycle handlebar stem for attaching a handlebar to a steering fork on a bicycle.

2. Discussion of the Related Art

On a traditional two-wheel bicycle, the front wheel is mounted on a steering fork which is itself attached to the neck of the frame of the bicycle. The steering fork normally includes a crown, two downwardly extending front fork stays to which the front wheel is attached, and an upwardly extending steering tube which is inserted through the neck of the frame. The steering tube is essentially a pipe or tube normally made of metal, although in view of recent advancements in materials used to manufacture bicycles the steering tube might alternatively be made of advanced composite fibers or other lightweight structural material.

The handlebar is attached to the top of the steering tube with a clamping device commonly called a stem. The stem is essentially a two-ended clamp in which one end of the stem is clamped to the steering tube and the handlebar is clamped onto the other end of the stem. It is through this assembly of the handlebar, stem and steering fork that the rider is able to steer the bicycle.

In prior art stems, the clamping means for attaching the handlebar to the stem has typically been comprised of a semi-cylindrical recess in the body of the stem, a cover member with an opposing semi-cylindrical recess, and a set of at least two fasteners for fastening the top and bottom portions of the cover plate, respectively, to the body of the stem. The stem depicted in Kalloy drawing no. 85.0216 is illustrative of a common bicycle handlebar stem. In this type of device, the handlebar is essentially sandwiched between the two opposing semi-cylindrical surfaces in the cover plate and the body of the stem.

The other end of the stem has a second clamping means for attaching the stem to the top of the steerer tube on the steering fork. In prior art stems this portion of the stem has typically consisted of a common C-clamp. The Kalloy stem mentioned above is again illustrative of the type of C-clamp commonly found on many prior art stems. On the Kalloy stem, the C-clamp is comprised of a first wall portion which wraps from the body of the stem rearwardly around one side of the top of the steering tube, and a second wall portion which also wraps from the body of the stem rearwardly around the other side of the top of the steering tube. A small space separates the ends of the first and second wall portions. At least one and normally two fasteners are fastened to the ends of the first and second wall portions of the C-clamp. Tightening the fasteners consequently results in compressing the space between the ends of the two wall portions to tighten the C-clamp around the steering tube.

Although such prior art stems have proven to be functional, an improved bicycle handlebar stem is nonetheless desired.

SUMMARY OF THE INVENTION

A bicycle handlebar stem, said stem including an improved clamping means for attaching the stem to a steering fork on a bicycle, and also including an improved clamping means for attaching the handlebar to the stem is disclosed.

Concerning the first clamping means for attaching the stem to the generally vertically oriented steering tube on the steering fork, said first clamping means is comprised of a continuous wall section which extends completely and continuously around the steering tube. There are no spaces or gaps in the wall section which wraps around the steering tube. Instead the wall section is a unitary portion of the stem which stretches from one side portion of the central body of the stem continuously around the backside of the steering tube and is integrally re-joined onto the opposite side portion of the stem. The means for tightening the stem onto the steering tube is provided not by any break in the wall portion which wraps around the steering tube but rather by a slot which extends inwardly into the center of the body of the stem. One or more fasteners is provided, which, upon tightening, compresses the slot to thereby reduce the circumference of the wall section which surrounds the steering tube and thereby tighten the stem. This method of clamping provides a much more uniform clamping force around the entire outer circumference of the steering tube.

Concerning the second clamping means for attaching the handlebar to the stem, said second clamping means is comprised of an arcuate-shaped cover member fastened over an arcuate-shaped recess in an end portion of the stem. The handlebar is essentially clamped between the cover member and the end of the stem. Moreover, the cover member is assembled to the stem by virtue of a mechanical hinge and a single fastener. This second clamping means is also much improved over the prior art in that it too provides a more uniform clamping force around the entire circumference of the handlebar, and moreover provides a clamping mechanism which requires the use of only a single fastener, which is of course quicker and easier to both assemble and adjust than the multiple fasteners required on the Kalloy stem and similar designs.

Other objects, features and advantages of the present invention will become apparent to those skilled in the art from the following detailed description and accompanying drawings.

BRIEF DESCRIPTION OF THE DRAWINGS

The drawings, which constitute a part of this specification and include an exemplary embodiment of the present invention, include the following.

FIG. 8 is a partial cross sectional view of the stem illustrating the clamping means for attaching the stem to the steerer tube on the bicycle.

FIG. 9 is a cross section view relative to line 9—9 of FIG. 8.

FIG. 10 is a cross section view relative to line 10—10 of FIG. 8.

FIG. 11 is a front view showing the manner in which the cover plate fits into the front portion of the stem.

DETAILED DESCRIPTION OF THE PREFERRED EMBODIMENT

Figure 1:
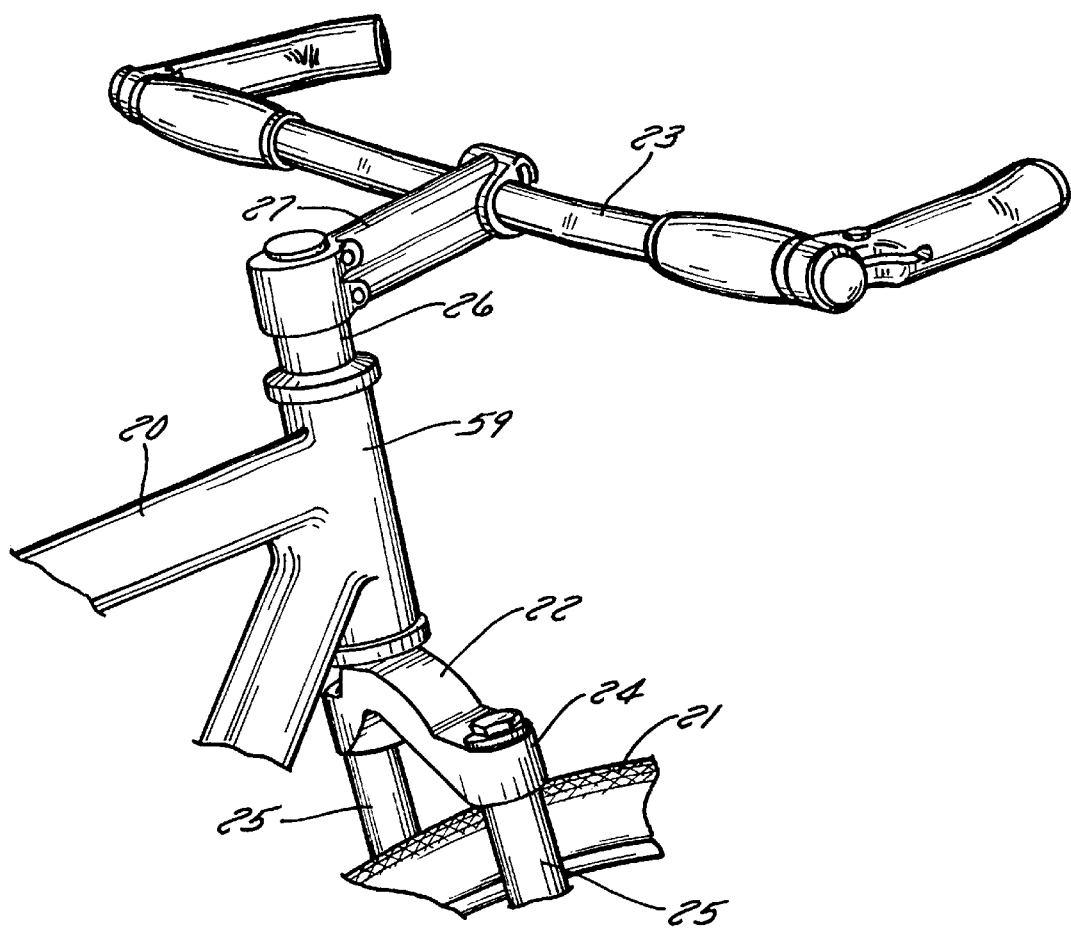
FIG. 1 is a perspective view of the front neck portion of a bicycle frame.

A traditional two-wheel bicycle is commonly comprised of a frame 20, a front wheel 21, a rear wheel, a seat, pedals and a steering assembly comprised of a steering fork 22 and handlebar 23. The steering fork 22 includes a crown 24, two downwardly extending front fork stays 25 to which the front wheel 21 is attached, and an upward extending steering tube 26 which is inserted through the neck 59 of the frame 20. A clamping device, referred to hereafter as a stem 27, is used for attaching the handlebar 23 to the top of the steering tube 26.

The stem 27 may be generally described as a stem body having a tubular central portion 28, a first end 31, and a second end 32. On the first end 31 of the stem 27 is a first clamping means for attaching the stem 27 to the generally vertically oriented steering tube 26 on the steering fork 22. On the second end 32 of the stem 27 is a second clamping means for attaching a generally horizontally oriented tubular portion of a handlebar 23 to the stem 27.

Figure 2:
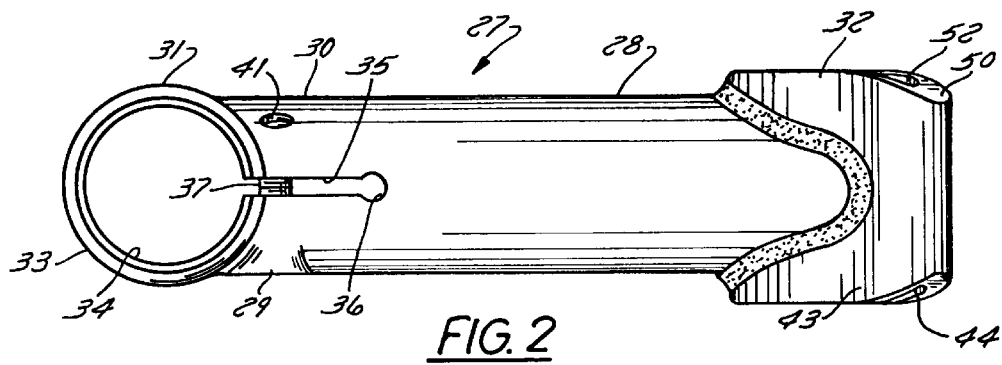
FIG. 2 is a top view of the handlebar bicycle stem disclosed herein.
Figure 3:
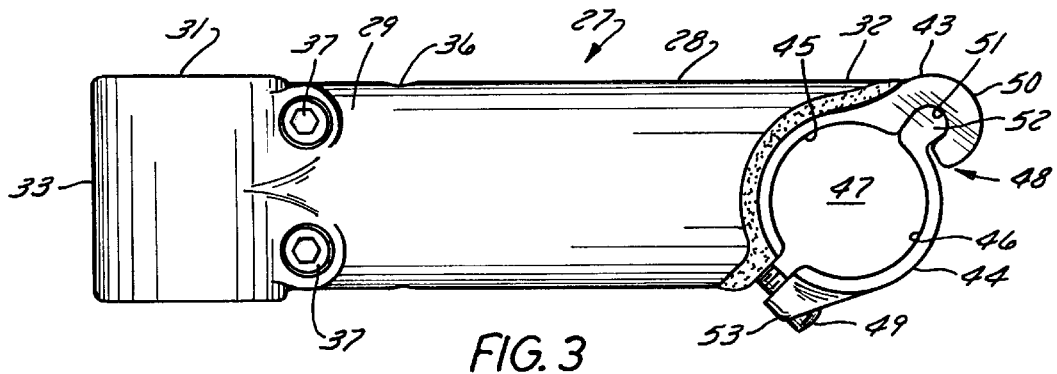
FIG. 3 is a right side view of the stem.
Figure 4:
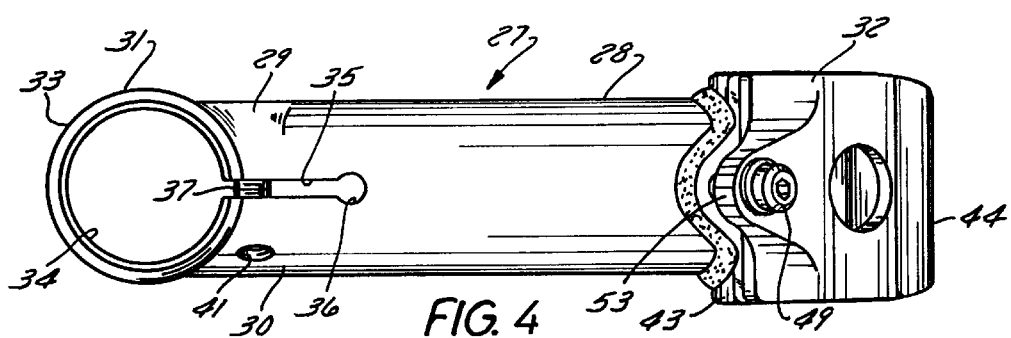
FIG. 4 is a bottom view of the stem.
Figure 5:
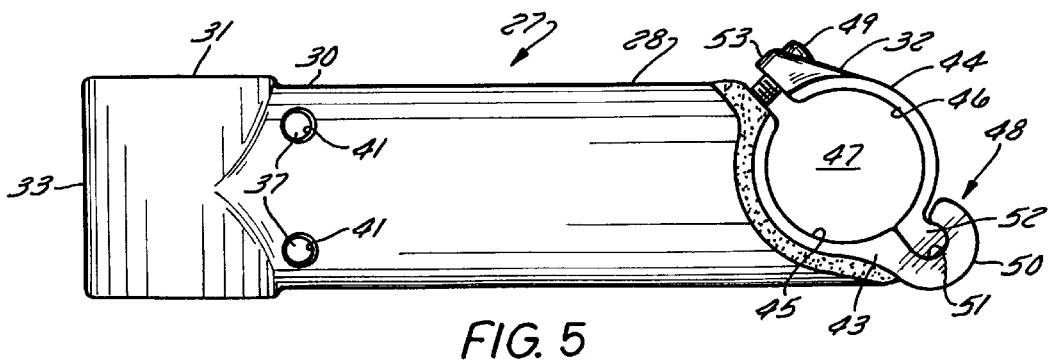
FIG. 5 is a left side view (opposite FIG. 3) of the stem.
Figure 6:
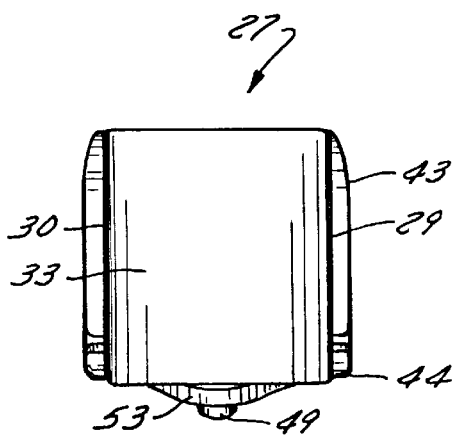
FIG. 6 is a rear view of the stem.
Figure 7:
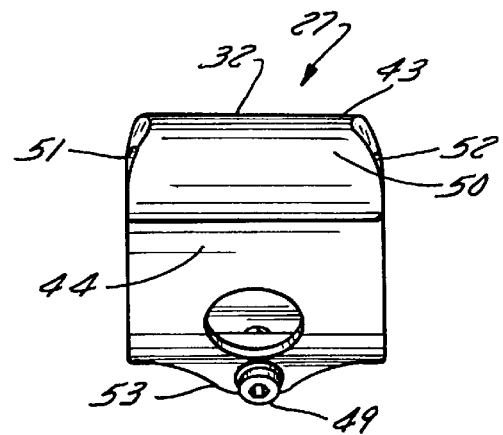
FIG. 7 is a front view of the stem.

The first clamping means for attaching the stem 27 to the steering tube 26 is comprised of a continuous wall section 33 which extends from a first side portion 29 of the tubular center portion 28 of the stem 27 circumferentially around the steering tube 26 and is joined to a second side portion 30 of the tubular center portion 28 of the stem 27. The continuous wall section 28 defines a substantially cyclindrical opening 34 in the stem 27, said opening 34 having a diameter corresponding generally to the outer circumference of the steering tube 26. The cyclindrical opening 34 formed by the continuous wall section 33 may be reduced in diameter by virtue of a slot 35 which extends from the cylindrical opening 34 inwardly into the center of the tubular central portion 28 of the stem. The slot 35 is essentially a gap which separates the first and second side portions 29 and 30 of the tubular central portion of the stem. The slot 35 has a relatively uniform thickness starting from the cylindrical opening 34 and extending inwardly a distance into the tubular central portion 28 of the stem 27, and then terminates at a substantially cylindrical relief opening 36, the diameter of the relief opening 36 being slightly greater than the uniform thickness of the slot 35, as illustrated for instance in FIGS. 2, 4 and 8. The slot 35 of course extends into both the upper and lower wall portions of the tubular central portion 28 of the stem 27.

At a portion of the stem 27 immediately adjacent the cylindrical opening 34 for the steering tube 26 is one, and preferably two, fasteners 37. The fasteners 37 extend perpendicularly across the gap from the first side portion 29 to the second side portion 30 of the tubular central portion 28 of the stem 27. Each fastener 37 is composed of a head 38 and a threaded shaft 39. There is a clearance hole 40 in the first side portion 29 of the tubular central portion 28 of the stem 27 and a threaded hole 41 in the second end portion 30. The head 38 of the fastener 37 naturally engages a stop surface 42 in the clearance hole 40 and the shaft 39 is threadably engaged in the threaded hole 41. Consequently, normal clockwise rotation of the threaded fastener 37 causes the first side portion 29 of the tubular central portion 28 of the stem 27 to become compressed toward the second side portion 30. This tightening action in turn causes the diameter of the cylindrical opening 34 to be reduced to thereby tighten the stem 27 onto the end of the vertical steering tube 26.

On the opposite end 32 of the stem 27 is the second clamping means for attaching the handlebar 23 to the stem 27. The second clamping means is essentially comprised of an arcuate-shaped end portion 43 of the stem defining an inwardly recessed first semi-cylindrical surface 45, and a cooperating arcuate-shaped cover member 44 defining a second substantially cylindrical surface 46. The arcuate-shaped end portion 43 of the stem and the arcuate-shaped cover member 44 together define a substantially cylindrical opening 47 having a diameter corresponding generally to the outer circumference of the generally horizontally oriented tubular portion of the handlebar 23. The cover member 44 is attached to the second end 32 of a stem 27 by means of a mechanical hinge 48 and only one fastener 49.

The mechanical hinge 48 is comprised of, on one portion of the arcuate-shaped end portion 43 of the stem, a hook-shaped wall portion 50. The hook-shaped wall portion 50 extends radially outwardly from a first end of the first semi-cylindrical surface 45. The hook-shaped wall portion 50 defines an elongated slot or groove 51 which runs substantially parallel to the longitudinal direction of the tubular portion of the handlebar 23 which is attached to stem 27. On a corresponding end portion of the arcuate-shaped cover member 44 is a radially outward protruding edge 52 which fits snugly within the elongated groove 51.

On the opposite second end of the arcuate-shaped cover member 44 and extending radially outward therefrom is an outwardly protruding second edge portion 53 having a clearance hole 54 therein. The stem 27 also includes a corresponding threaded hole 55. The fastener 49 is of course comprised of a head 56 and a threaded shaft 57, the head 56 engaging a stop surface 58 in the clearance hole 54 and the shaft 57 threadably engaged in the threaded hole 55 in the stem 27. Consequently, the cover member 44 is assembled to the body of the stem 27 by virtue of the first edge portion 52 of the cover member 44 being held in place within the groove 51 in the hooked-shaped wall portion 50 of the stem 27, and the second edge portion 53 of the covered member 44 being secured by the fastener 49 to the stem 27. Normal clockwise rotation of the fastener 49 naturally causes the handlebar 23 to become compressed between the cover member 44 and the end 43 of the stem 27. The primary advantage of this arrangement is that the handlebar 23 can be assembled and also easily adjusted by simply tightening only a single fastener 49.

The bicycle handlebar stem presented herein has been described in specific reference to a preferred embodiment shown in the drawings. Specific details disclosed above and illustrated in the drawings are naturally presented for descriptive purposes only. Therefore, specific structural and functional details disclosed above are not to be interpreted as limiting, but merely as a basis for the claims and for teaching one skilled in the art to variously employ the present invention in any appropriately detailed manner. Changes may be made in the details of construction, arrangement or operation of the invention without departing from the spirit of the invention.

Finally, it should be noted that the applicant herein has also filed an application for a design patent, said design patent application having been filed on the same date and under the same inventor, assignee and title as the present application. Accordingly, any subject matter disclosed in said design patent application is fully incorporated herein by reference.

What is claimed is:

1. A bicycle handlebar stem capable of attachment to a generally horizontal central portion of a handlebar and to a generally vertical steering tube of a steering fork on a bicycle, said bicycle handlebar stem comprising:

a stem body, said stem body having a tubular central portion, a first end, and a second end;

on said first end, a first clamping means for attaching the stem to the generally vertical steering tube of the steering fork;

on said second end, a second clamping means for attaching the stem to the generally horizontal central portion of the handlebar;

said first clamping means being comprised of a continuous wall section extending from a first portion of the tubular central portion circumferentially around the generally vertical steering tube to a second portion of the tubular central portion of the stem body, said continuous wall section defining a substantially cylindrical opening having a diameter corresponding generally to the outer circumference of the vertical steering tube;

said first clamping means further comprising a slot extending from the cylindrical opening inwardly into the tubular central portion of the stem body thereby providing a space between the first portion and second portion of the tubular central portion of the stem body;

said slot separating the first portion and second portion of the tubular central portion of the stem body, said slot having a substantially uniform thickness starting from the cylindrical opening and extending inwardly a distance into the tubular central portion of the stem body, with the slot terminating at a substantially circular relief opening, said relief opening having a diameter greater than said uniform thickness; and, a threaded fastener extending perpendicularly across said slot from the first portion to the second portion of the tubular central portion of the stem body;

wherein tightening of said threaded fastener causes the first portion to become compressed toward the second portion thereby causing the continuous wall section to become reduced in diameter and compressed around the generally vertical steering tube.

2. The bicycle handlebar stem of claim 1, wherein said first portion includes a clearance hole and said second portion includes a threaded hole;

said fastener is composed of a head and a threaded shaft, said head engaging a stop surface in said clearance hole and said shaft threadably engaged in said threaded hole;

whereby clockwise rotation of said fastener causes said compression of the first and second portions of the tubular central portion of the stem body.

3. The bicycle handlebar stem of claim 1, wherein said second clamping means comprises:

an inwardly recessed semi-cylindrical surface on the second end of the stem body;

an arcuate-shaped cover member fastened over the second end of the stem body, said arcuate-shaped cover member having a second semi-cylindrical surface, the two semi-cylindrical surfaces on the second end of the stem body and on the arcuate-shaped cover member together defining a second substantially cylindrical opening, said second substantially cylindrical opening having a diameter corresponding generally to an outer circumference of the generally horizontal central portion of the handlebar;

said arcuate-shaped cover member being fastened to the second end of the stem body by a mechanical hinge and a single threaded fastener.

4. The bicycle handlebar stem of claim 3, wherein the mechanical hinge is comprised of a hook-shaped wall portion extending radially outwardly from the semi-cylindrical surface on the second end of the stem body, said hook-shaped wall portion defining an elongated groove, and on a corresponding end portion of said arcuate-shaped cover member a radially outwardly protruding edge which fits snugly within said elongated groove.

5. The bicycle handlebar stem of claim 4, wherein the arcuate-shaped cover member includes a second radially outwardly protruding end portion having a clearance hole therein;

the second end of the stem body includes a threaded hole;

the fastener is comprised of a head and a threaded shaft, said head engaging a stop surface in said clearance hole and said shaft threadably engaged in said threaded hole in said second end of the stem body;

whereby clockwise rotation of said fastener causes a reduction in the diameter of the second substantially cylindrical opening.

6. A bicycle handlebar stem for attaching a generally horizontal central portion of a handlebar to a generally vertical steering tube of a steering fork on a bicycle, said bicycle handlebar stem comprising:

a stem body, said stem body having a first end portion and a second end portion and a tubular central portion therebetween;

said first end portion including a first clamping means for attaching the stem to the generally vertical steering tube on the steering fork of the bicycle;

said second end portion including a second clamping means for attaching the stem to the generally horizontal tubular central portion of the handlebar, said second clamping means comprising:

a recessed semi-cylindrical clamping surface on the second end portion of the stem body;

a cover member having a second semi-cylindrical clamping surface;

the two semi-cylindrical clamping surfaces together defining a substantially cylindrical opening having a diameter corresponding generally to an outer circumference of the generally horizontal central portion of the handlebar;

a mechanical hinge on one side of the cylindrical opening connecting the cover member to the stem body; and a single threaded fastener on the other side of the cylindrical opening fastening the cover member to the stem body.

7. The bicycle handlebar stem of claim 6, wherein the mechanical hinge is comprised of:

a hook-shaped wall portion extending radially outwardly from the recessed semi-cylindrical clamping surface on the second end portion of the stem body, said hook portion defining an elongated groove;

an elongated edge extending radially outwardly from the second semi-cylindrical clamping surface on the cover member, said elongated edge fitting snugly within the elongated groove.

8. The bicycle handlebar stem of claim 7, further comprising a second wall portion extending radially outwardly from the recessed semi-cylindrical clamping surface in a direction opposite of the hook-shaped wall portion, said second wall portion having a threaded hole therein;

a second edge on the cover member extending radially outwardly from the semi-cylindrical cover member in a direction opposite of the elongated edge, said second edge having a clearance hole with a stop surface therein;

said fastener being comprised of a head engaging the stop surface in the clearance hole and a threaded shaft threadably engaged in the threaded hole in the second wall portion, whereby clockwise rotation of the fastener causes a reduction in the diameter of the cylindrical opening defined by the two semi-cylindrical clamping surfaces.

9. The handlebar stem of claim 6, wherein said first clamping means is comprised of a continuous wall section extending from a first portion of the tubular central portion circumferentially around the generally vertical tubular steering tube to a second portion of the tubular central portion of the stem body, said continuous wall section defining a second substantially cylindrical opening having a diameter corresponding generally to the outer circumference of the tubular vertical steering tube;

said first clamping means further comprising a slot extending from the second cylindrical opening inwardly into the tubular central portion of the stem body thereby providing a space between the first portion and second portion of the tubular central portion of the stem body;

a second threaded fastener extending perpendicularly across said slot from the first portion to the second portion of the tubular central portion of the stem body;

wherein tightening of said threaded fastener causes the first portion to become compressed toward the second portion thereby causing the continuous wall section to become reduced in diameter and compressed around the generally vertical steering tube.

10. The bicycle handlebar stem according to claim 9, wherein said slot separates the first portion and second portion of the tubular central portion of the stem body, said slot having a relatively uniform thickness starting from the cylindrical opening and extending inwardly a distance into the tubular central portion of the stem body, with the slot terminating at a substantially circular relief opening, said relief opening having a diameter greater than said uniform thickness.

11. The bicycle handlebar stem of claim 9, wherein said first portion includes a clearance hole and said second portion includes a threaded hole;

said fastener is composed of a head and a threaded shaft, said head engaging a stop surface in said clearance hole and said shaft threadably engaged in said threaded hole;

whereby clockwise rotation of said fastener causes said compression of the first and second portions of the tubular central portion of the stem body.

* * * * *